(12) United States Patent
Von Berg et al.

(10) Patent No.: US 10,570,776 B2
(45) Date of Patent: Feb. 25, 2020

(54) NOZZLE FOR DELIVERING FLUID TO A COMPONENT

(71) Applicant: United Technologies Corporation, Farmington, CT (US)

(72) Inventors: Kaleb Von Berg, East Hartford, CT (US); Christopher T. Anglin, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 589 days.

(21) Appl. No.: 15/175,319

(22) Filed: Jun. 7, 2016

(65) Prior Publication Data

US 2017/0350275 A1 Dec. 7, 2017

(51) Int. Cl.
*F01D 25/18* (2006.01)
*F16N 21/04* (2006.01)

(52) U.S. Cl.
CPC ............ *F01D 25/18* (2013.01); *F16N 21/04* (2013.01); *F05D 2220/32* (2013.01); *F05D 2260/98* (2013.01)

(58) Field of Classification Search
CPC ........ F01D 15/12; F01D 25/18; F01D 25/125; F01D 9/06; F02C 3/107; F02C 7/22; F02C 7/222; F02C 7/06; F05D 2260/98; F05D 2220/52; F05D 2240/55; F05D 2220/32; B05B 15/66; B05B 15/60; B05B 1/14; B05B 15/65; B05B 11/0008; F01M 1/08; F16N 7/34; F16N 21/04; B05N 11/0008
USPC ............................. 60/39.08; 184/13.1, 26, 31
See application file for complete search history.

(56) References Cited

U.S. PATENT DOCUMENTS

| 4,648,485 | A | | 3/1987 | Kovaleski | |
|---|---|---|---|---|---|
| 4,714,139 | A | * | 12/1987 | Lorenz | B01D 19/0031 184/6.11 |
| 6,102,577 | A | * | 8/2000 | Tremaine | F01D 9/065 184/104.1 |
| 8,020,384 | B2 | * | 9/2011 | Pelletier | F23R 3/286 239/494 |
| 8,408,801 | B2 | | 4/2013 | Waki | |

(Continued)

FOREIGN PATENT DOCUMENTS

| DE | 10250693 | 5/2004 |
|---|---|---|
| DE | 102010023657 | 1/2011 |

(Continued)

OTHER PUBLICATIONS

Extended EP Search Report for EP Appln. No. 17174837.9 dated Sep. 29, 2017.
Office action for EP17174837.9 dated Nov. 18, 2019.

*Primary Examiner* — Ehud Gartenberg
*Assistant Examiner* — Jacek Lisowski
(74) *Attorney, Agent, or Firm* — Getz Balich LLC

(57) ABSTRACT

A system is provided that includes a support structure and a nozzle. The support structure includes a cavity surface and an aperture. The cavity surface at least partially forms a boundary of a cavity. The aperture extends partially into the support structure from the cavity surface. The nozzle includes a mount, a neck and a head. The mount is seated within the aperture. The neck is connected to the mount and extends axially along a centerline away from the surface to the head. The head is configured to inject fluid out of the nozzle and into the cavity.

16 Claims, 8 Drawing Sheets

(56) References Cited

U.S. PATENT DOCUMENTS

| | | | |
|---|---|---|---|
| 8,944,749 B2* | 2/2015 | Durocher | F01D 9/065 |
| | | | 184/6.11 |
| 2009/0133581 A1* | 5/2009 | Fang | B01D 45/14 |
| | | | 96/216 |
| 2011/0219809 A1 | 9/2011 | Kurihara | |
| 2012/0011824 A1 | 1/2012 | Cigal et al. | |
| 2015/0369082 A1 | 12/2015 | Schwarz et al. | |
| 2016/0003090 A1 | 1/2016 | Lin | |
| 2016/0003143 A1 | 1/2016 | Sheridan et al. | |
| 2016/0032765 A1 | 2/2016 | Shuaib et al. | |
| 2016/0326920 A1 | 11/2016 | Takasaki | |

FOREIGN PATENT DOCUMENTS

| | | |
|---|---|---|
| DE | 102013012301 | 1/2015 |
| DE | 102013213137 | 1/2015 |

* cited by examiner

NOZZLE FOR DELIVERING FLUID TO A COMPONENT

BACKGROUND OF THE INVENTION

1. Technical Field

This disclosure relates generally to fluid delivery and, more particularly, to a nozzle for delivering fluid, such as lubricant, to a component.

2. Background Information

Various types of nozzle configurations are known in the art. While these nozzle configurations have certain benefits, there is still room in the art for improvement. For example, a typical prior art nozzle for a lubricant system of a gas turbine engine uses a bolt to secure the nozzle to a supporting structure. Such a mounting arrangement, however, requires a certain minimum amount of space within the turbine engine to implement. There is a need in the art therefore for an improved nozzle.

SUMMARY OF THE DISCLOSURE

According to an aspect of the present disclosure, a system is provided that includes a support structure and a nozzle. The support structure includes a cavity surface and an aperture. The cavity surface at least partially forms a boundary of a cavity. The aperture extends partially into the support structure from the cavity surface. The nozzle includes a mount, a neck and a head. The mount is seated within the aperture. The neck is connected to the mount and extends axially along a centerline away from the surface to the head. The head is configured to inject fluid out of the nozzle and into the cavity.

According to another aspect of the present disclosure, a system is provided for a gas turbine engine. The system includes a support structure, a nozzle, a seal ring and a retainer. The support structure includes a first surface and an aperture. The aperture extends into the support structure from the first surface. The aperture includes a bore and a counterbore. The nozzle includes a tubular mount, a tubular neck and a head. The mount includes a tubular coupler and an annular mounting flange. The tubular coupler projects axially along a centerline into the bore to a distal end of the nozzle. The annular mounting flange is seated within the counterbore. The neck is connected axially between the annular mounting flange and the head. The seal ring is disposed axially between the annular mounting flange and an annular surface of the support structure. The retainer is within the counterbore and configured to retain the mount within the aperture.

According to still another aspect of the present disclosure, a lubricant nozzle is provided that includes a mount, a neck and a head respectively disposed along an axial centerline of the lubricant nozzle. The mount includes a coupler and an annular mounting flange. The coupler projects axially from the annular mounting flange to a distal end of the lubricant nozzle. The coupler includes a lubricant inlet at the distal end. The neck extends axially between the mount and the head. The head includes at least one orifice operable to receive lubricant from an internal fluid passage and direct the received lubricant out of the nozzle. The internal fluid passage is coupled between the lubricant inlet and the orifice. The internal fluid passage extends axially along the centerline through the mount and the neck.

The tubular coupler may include a conical surface that extends axially to the distal end. The mount may include a tab that projects radially out from the annular mounting flange.

The system may include a seal element sealingly engaged with and disposed between the support structure and the mount.

The system may include a (e.g., annular or non-annular) annular seal element sealingly engaged with and disposed axially between an annular surface of the support structure and an annular surface of the mount. The annular surface of the support structure may partially form a boundary of the aperture.

The system may include a (e.g., annular or non-annular) seal element sealingly disposed axially between an annular surface of the support structure and an annular surface of the mount. The annular surface of the support structure may partially form a boundary of the aperture. The seal element may radially engage the support structure and the nozzle.

The system may include a retainer configured to retain the mount within the aperture.

The retainer may be a retainer ring. The retainer may axially engage the mount. The retainer may project radially into an annular channel in the support structure.

The aperture may include a bore and a counterbore. The mount may include a tubular coupler and an annular mounting flange. The tubular coupler may project axially into the bore to a distal end of the nozzle. The annular mounting flange may be seated within the counterbore.

The tubular coupler may include a conical surface that engages the support structure. A gap may extend axially between and separate the distal end and the support structure.

A ring seal may sealingly engage and be disposed axially between the annular mounting flange and the support structure. The tubular coupler may project axially through the ring seal and into the bore.

The aperture may include a slot. The mount may include a tab that projects radially out from the annular mounting flange and is seated within the slot.

A first fluid passage may extend within the support structure to the aperture. A second fluid passage may extend within the nozzle to at least one nozzle orifice in the head. The second fluid passage may be fluidly coupled with the first fluid passage.

The nozzle may be a lubricant nozzle.

The system may include a turbine engine component in the cavity. The nozzle may be configured to direct lubricant onto the turbine engine component.

The system may include a plurality of turbine engine components in the cavity. The nozzle may be configured to direct lubricant onto one or more of the turbine engine components.

The first surface may at least partially form a boundary of a cavity. The head may be configured to inject lubricant out of the nozzle and into the cavity.

The foregoing features and the operation of the invention will become more apparent in light of the following description and the accompanying drawings.

DETAILED DESCRIPTION OF THE INVENTION

Figure 1:
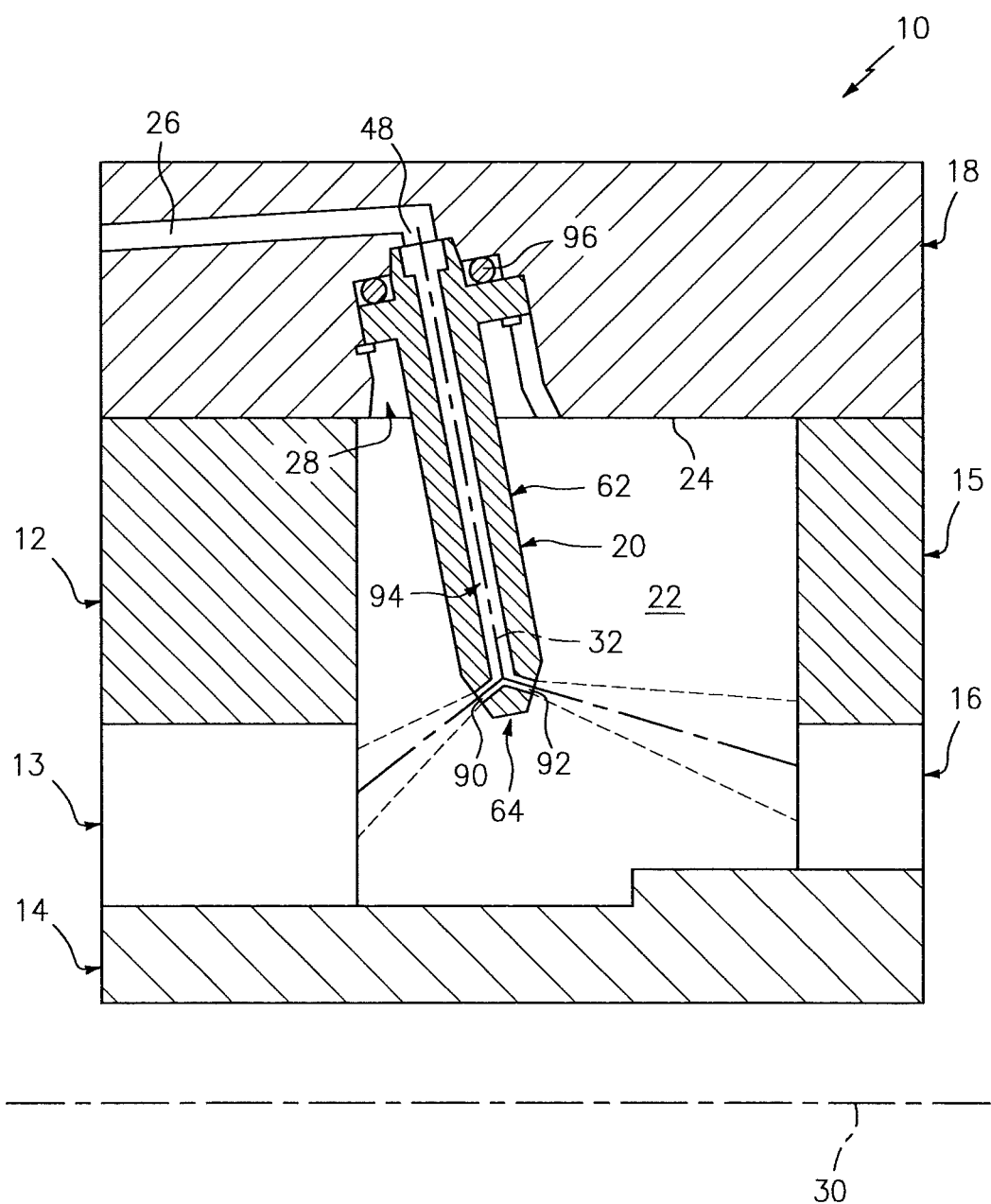
FIG. 1 is a partial, sectional schematic illustration of a system for a piece of rotational equipment.

FIG. 1 illustrates a system 10 for a piece of rotational equipment such as a gas turbine engine. This system 10 includes one or more other components 12-16, a support structure 18 (e.g., a case, housing, etc.), and at least one nozzle 20; e.g., a lubricant nozzle.

Briefly, the first component 12 mounts the second component 13 (shown in block diagram form) to the support structure 18. The second component 13 may be a bearing (e.g., a roller element bearing). The second component 13 is disposed within a cavity 22; e.g., a bearing cavity. The second component 13 is configured to rotatably support the third component 14, which is a rotating element such as a shaft, sleeve, etc. The fourth component 15 mounts the fifth component 16 (shown in block diagram form) to the support structure 18. The fifth component 16 may be a seal device (e.g., a contact or non-contact seal), and configured to fluidly isolate (decouple) the cavity 22 from another adjacent area within the piece of rotational equipment.

Figure 2:
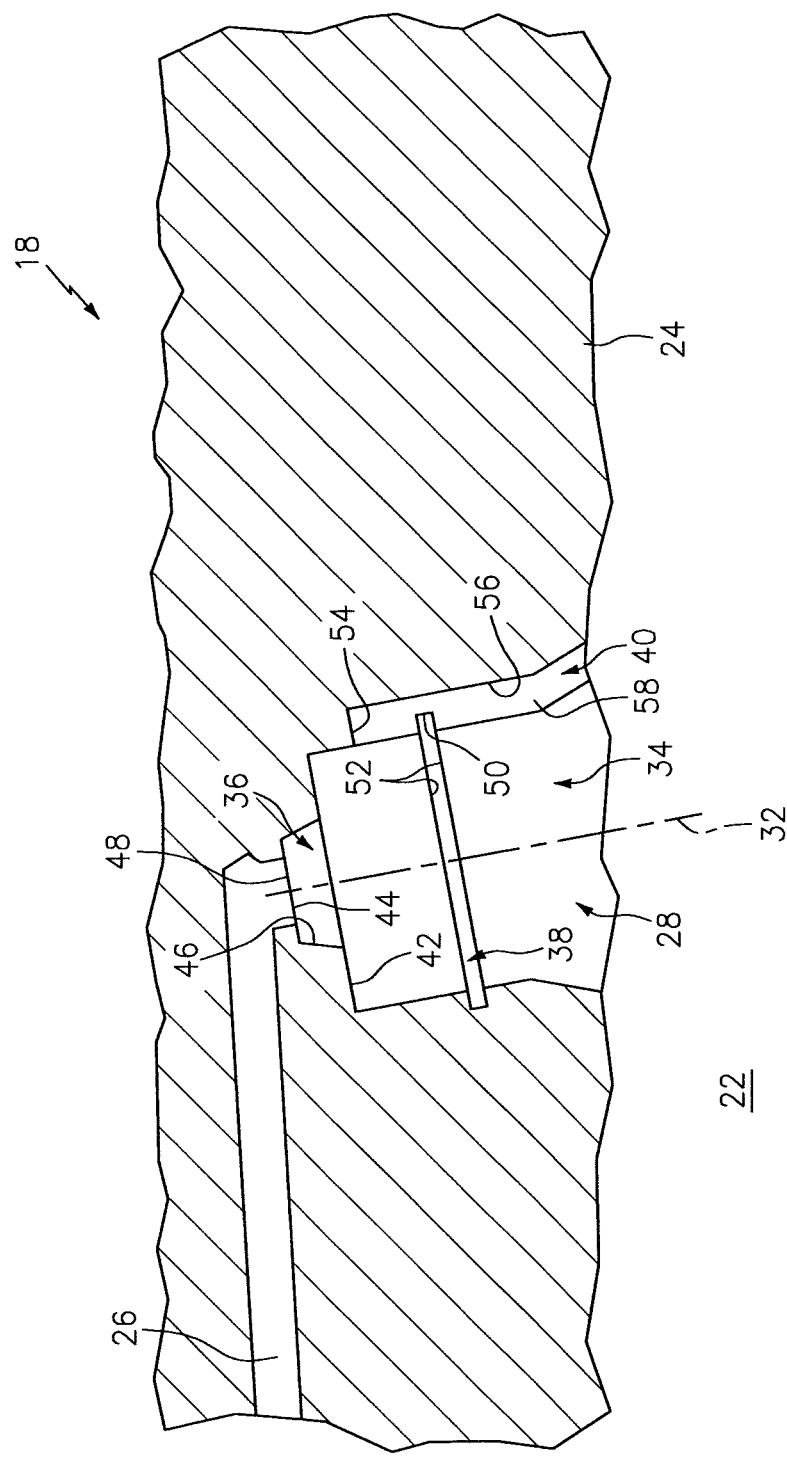
FIG. 2 is a partial, sectional schematic illustration of a support structure.

Referring to FIG. 2, the support structure 18 includes a cavity surface 24, at least one internal passage 26 and at least one mounting aperture 28. The cavity surface 24 of FIG. 2 is a radially inner surface of the support structure 18. This cavity surface 24 extends axially along a rotational axis 30 (see FIG. 1) of the piece of rotational equipment. The cavity surface 24 extends completely (or alternatively partially) circumferentially around the rotational axis 30. The cavity surface 24 at least partially forms a (e.g., radial outer) boundary of the cavity 22.

Referring again to FIG. 2, the internal passage 26 extends within the support structure 18 to the aperture 28. The aperture 28 extends partially axially along a centerline 32 into the support structure 18 from the cavity surface 24. The aperture 28 includes a counterbore 34, a bore 36, an annular channel 38 and at least one slot 40. The counterbore 34 extends axially along the centerline 32 partially into the support structure 18 and, more particularly, from the cavity surface 24 to a first annular surface 42; e.g., a shelf surface.

The bore 36 extends axially along the centerline 32 partially into the support structure 18 from the counterbore 34. More particularly, the bore 36 of FIG. 2 extends axially from the first annular surface 42 to a second annular surface 44; e.g., a shelf surface. The bore 36 of FIG. 2 also radially tapers and is formed by a conical surface 46. This conical surface 46 extends axially along the centerline 32 and radially tapers from the first annular surface 42 to the second annular surface 44. The bore 36 and, thus, the aperture 28 is fluidly coupled with the internal passage 26 through an orifice 48 at the second annular surface 44.

The channel 38 extends radially, relative to the centerline 32, into the support structure 18 to a distal end surface 50. The channel 38 extends axially along the centerline 32 between opposing side surfaces 52. The channel 38 extends through the support structure 18 circumferentially around the centerline 32.

The slot 40 extends axially along the centerline 32 and partially into the support structure 18. More particularly, the slot 40 extends axially from the cavity surface 24 to an axial distal slot surface 54, which is disposed axially between the first annular surface 42 and the channel 38. The slot 40 extends partially radially, relative to the centerline 32, into the support structure 18 to a radial distal slot surface 56. The slot 40 extends laterally (e.g., circumferentially or tangentially) between opposing side surfaces 58 (one shown).

Figure 3:
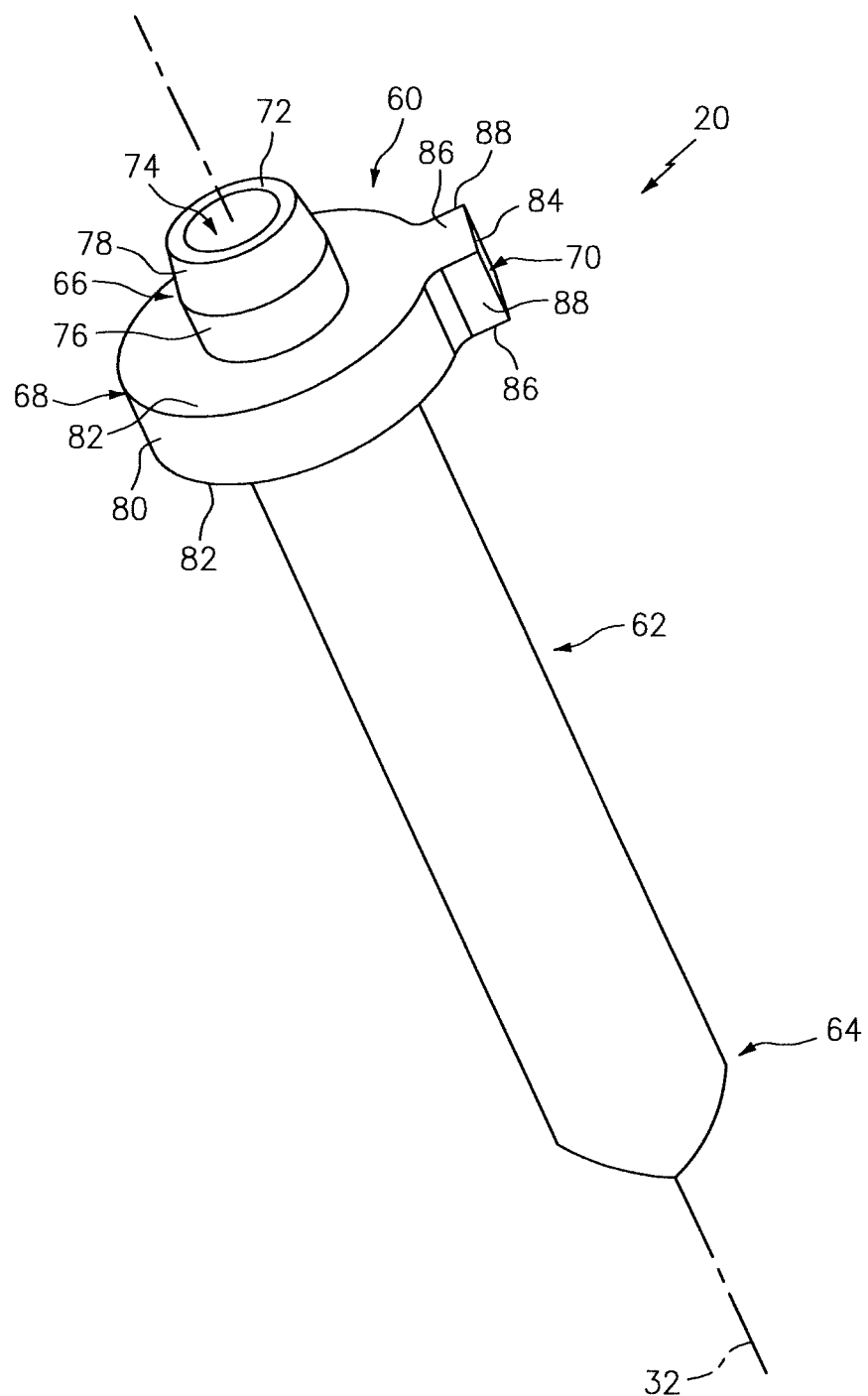
FIG. 3 is a perspective illustration of a fluid nozzle.
Figure 4:
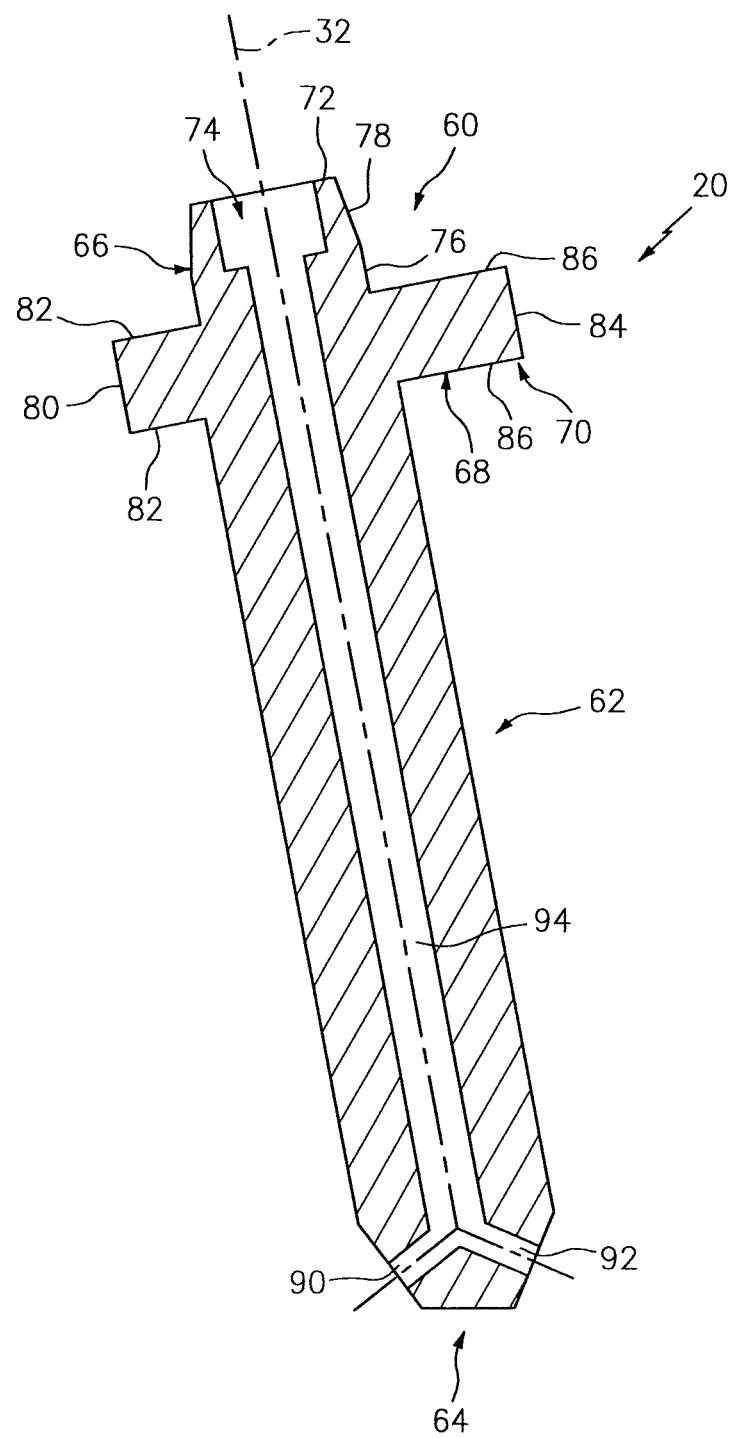
FIG. 4 is a sectional schematic illustration of the nozzle of FIG. 3.

Referring to FIGS. 3 and 4, the nozzle 20 includes a nozzle mount 60, a nozzle neck 62 and a nozzle head 64, which are respectively disposed along the axial centerline 32. The nozzle 20 of FIGS. 3 and 4 is formed as a monolithic body. More particularly, the nozzle components 60, 62 and 64 are cast, machined, additively manufactured and/or otherwise formed integral with one another as a single cohesive unit. However, the present disclosure is not limited to such a monolithic configuration.

The mount 60 includes a tubular coupler 66, an annular mounting flange 68 and at least one tab 70. The coupler 66 projects axially along the centerline 32 from the mounting flange 68 to distal end 72 of the nozzle 20. The coupler 66 forms an inlet 74 (e.g., a lubricant inlet) at the distal end 72. This inlet 74 may have a diameter that is greater than a diameter of the orifice 48 (see FIGS. 1 and 2), which provides a waterfall effect as fluid flow from the orifice 48 into the inlet 74. However, in other embodiments, the diameter of the inlet 74 may be equal to or less than the diameter of the orifice 48.

Referring again to FIGS. 3 and 4, the coupler 66 includes an outer cylindrical surface 76 and an outer conical surface 78. The cylindrical surface 76 extends axially along the centerline 32 from the mounting flange 68 to the conical surface 78. The conical surface 78 extends axially along the centerline 32 and radially tapers from the cylindrical surface 76 to the distal end 72. The geometry of this conical surface 78 is configured to substantially match the geometry of the conical surface 46 of the support structure 18 shown in FIG. 2.

The mounting flange 68 of FIGS. 3 and 4 projects radially outward relative to the centerline 32 to a distal flange end 80. The mounting flange 68 extends axially along the centerline 32 between opposing flange side surfaces 82. The mounting flange 68 extends circumferentially around the centerline 32. The mounting flange 68 of FIG. 4 has a substantially circular geometry; however, the present disclosure is not limited to such an exemplary geometry.

The tab 70 projects radially outward relative to the centerline 32 from the distal flange end 80 to a distal tab end 84. The tab 70 extends axially along the centerline 32 between opposing tab side surfaces 86, which may be respectively axially aligned with the opposing flange side surfaces 82. The tab 70 extends laterally between opposing tab end surfaces 88.

The neck 62 is connected to and extends axially between the mount 60 and the head 64. The head 64 includes one or more orifices 90 and 92. Each of these orifices 90, 92 is fluidly coupled with an internal passage 94 of the nozzle 20. This internal passage 94 may extend axially along the centerline 32 through the mount 60 and the neck 62, and fluidly couples the inlet 74 and the orifices 90 and 92 together.

Figure 5:
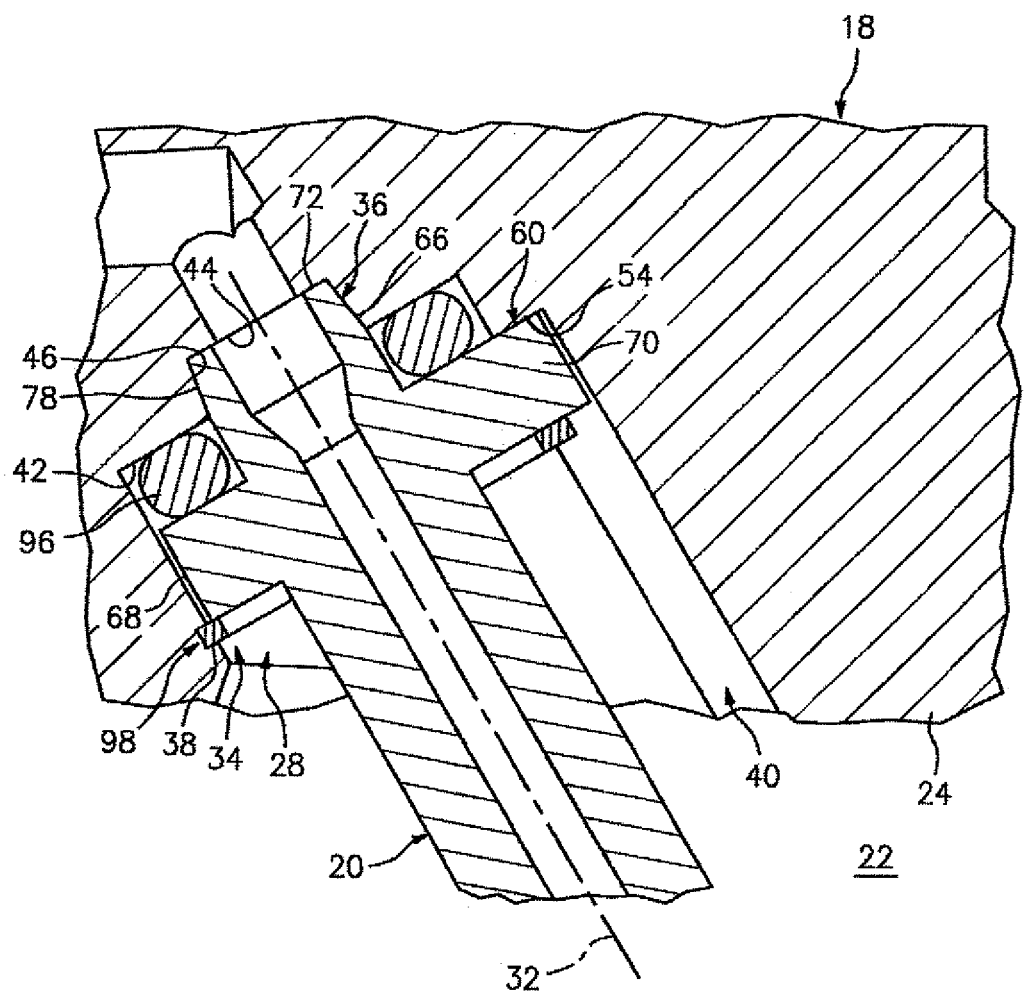
FIG. 5 is a sectional schematic illustration of a portion of the system of FIG. 1.
Figure 5B:
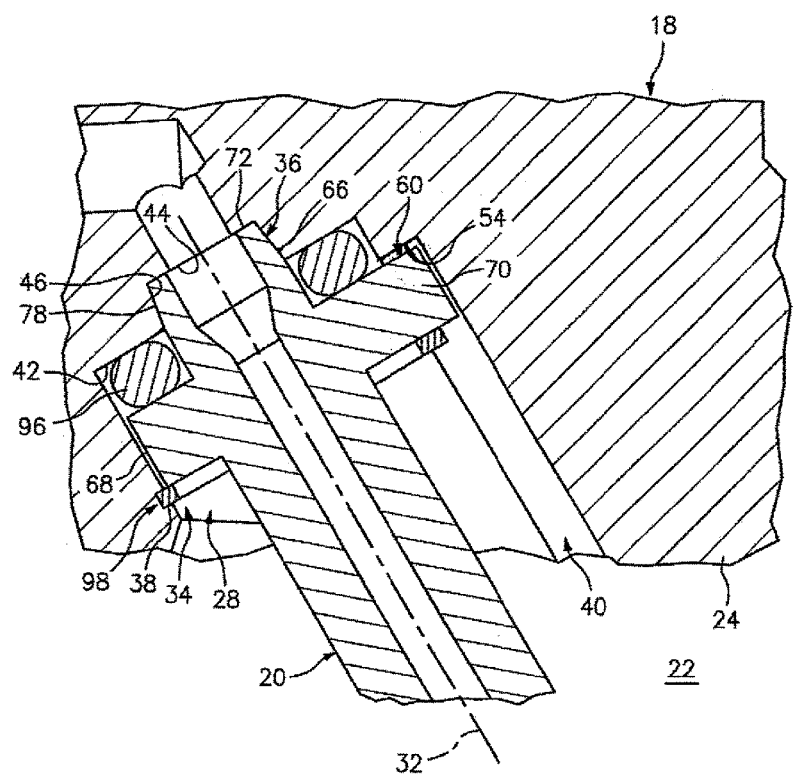
FIG. 5B is a sectional schematic illustration of an alternative portion of the system of FIG. 1.

Referring to FIG. 5, a seal element 96 (e.g., a ring seal) is mated with the mount 60. More particularly, the coupler 66 projects axially through the seal element 96 and the seal element 96 is abutted axially against the mounting flange 68. The mount 60 and the seal element 96 are seated within the aperture 28. More particularly, the coupler 66 projects axially into the bore 36 and the conical surfaces 46 and 78 engage (e.g., contact) one another. However, a gap may extend axially between and separate the distal end 72 from the second annular surface 44. The mounting flange 68 is seated within the counterbore 34 and axially engages the first annular surface 42 through the seal element 96, which may be axially compressed between and sealingly engages and thereby substantially fluidly seals a gap between the elements 18 and 68. The tab 70 is seated within the slot 40, and servers to locate the nozzle 20 relative to the support structure 18 as well as provide an anti-rotation feature. The tab 70, however, may be axially separated from the distal end 54 by a gap as shown in FIG. 5B. Referring again to FIG. 5, the mount 60 is retained axially within the aperture 28 by a retainer 98; e.g., a retainer ring. This retainer 98 is mated with the channel 38. More particularly, an outer portion of the retainer 98 projects radially relative to the centerline 32 into the channel 38, while an inner portion of the retainer 98 axially engages and thereby retains the mounting flange 68. However, in other embodiments, the seal element 96 may seal radially rather than or in addition to axially.

Referring to FIG. 1, the neck 62 extends axially along the centerline 32 away from the cavity surface 24 to the head 64. The head 64 is thereby positioned such that the orifices 90 and 92 may inject fluid (e.g., lubricant), received through the internal passages 26 and 94, into the cavity 22. The orifices 90 and 92 may further be operable to respectively direct that injected fluid towards and onto (and/or proximate) the components 13 and 16 to lubricate and/or cool at least those components 13 and 16.

The nozzle 20 may have various configurations different from that described above. The centerline 32 of the nozzle 20 of FIG. 4, for example, is angularly offset from the cavity surface 24 and the rotational axis 30 by acute included angles. However, in other embodiments, the nozzle 20 may be configured such that the centerline 32 is generally perpendicular to the cavity surface 24 and/or the rotational axis 30. In another example, while the centerline 32 is shown as following a straight line trajectory in the figures, the centerline 32 may alternatively follow a curvilinear and/or other type of trajectory. In still another example, the mount 60 may be configured with a plurality of tabs arranged about the centerline 32. Alternatively, the mount 60 may be configured without any tabs where, for example, a locating/anti-rotation feature is integral with the mounting flange 68. For example, the mounting flange 68 may have an elongated geometry, may include a flat, may include a notch for a key pin, etc. The nozzle 20 of the present disclosure, of course, is not limited to the exemplary configurations describe above.

In some embodiments, the nozzle 20 may be constructed from the same material as the support structure 18. In other embodiments, the nozzle 20 may be constructed from a different material than the support structure 18. Examples of suitable nozzle 20 and/or support structure 18 materials include, but are not limited to, metals such as stainless steel, nickel (Ni) alloy, titanium (Ti) alloy, aluminum (Al) alloy, cobalt (Co) alloy, etc.

In some embodiments, one or more surfaces of the nozzle 20 may include a coating. The conical surface 78 (see FIG. 5), for example, may include a hard coating to reduce wear between the surfaces 78 and 46.

In some embodiments, the seal element 96 may be dry fitted between the components. In other embodiments, lubricant or another material may be applied to the seal element 96. An example of such a material is wax.

In some embodiments, the seal element 96 may be configured as an O-ring. In some embodiments, the seal element 96 may be configured as an annular C-seal. In some embodiments, the seal element 96 may be configured as a flexible annular seal such as a flexible graphite seal or a rope seal. The seal element 96 of the present disclosure, however, is not limited to the foregoing exemplary configurations.

Figure 6:
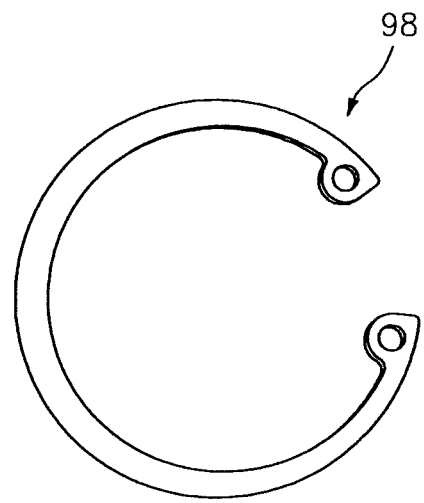
FIG. 6 is a perspective illustration of a retainer.
Figure 7:
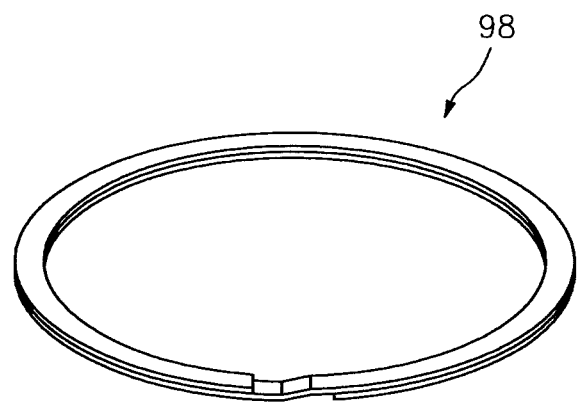
FIG. 7 is a perspective illustration of another retainer.

The retainer 98 described above is configured as a retainer ring. This retainer ring may be configured as a snap ring such as a C-clip ring as shown in FIG. 6. Alternatively, the retainer ring may be configured as a spiral retainer ring as shown in FIG. 7. The retainer 98 of the present disclosure, however, is not limited to the foregoing exemplary configurations. Furthermore, in some embodiments, the retainer 98 may be omitted where, for example, the mount 60 is retained within the aperture 28 by another form of mechanical attachment and/or bonded (e.g., brazed, adhered, etc.) to the support structure 18.

Figure 8:
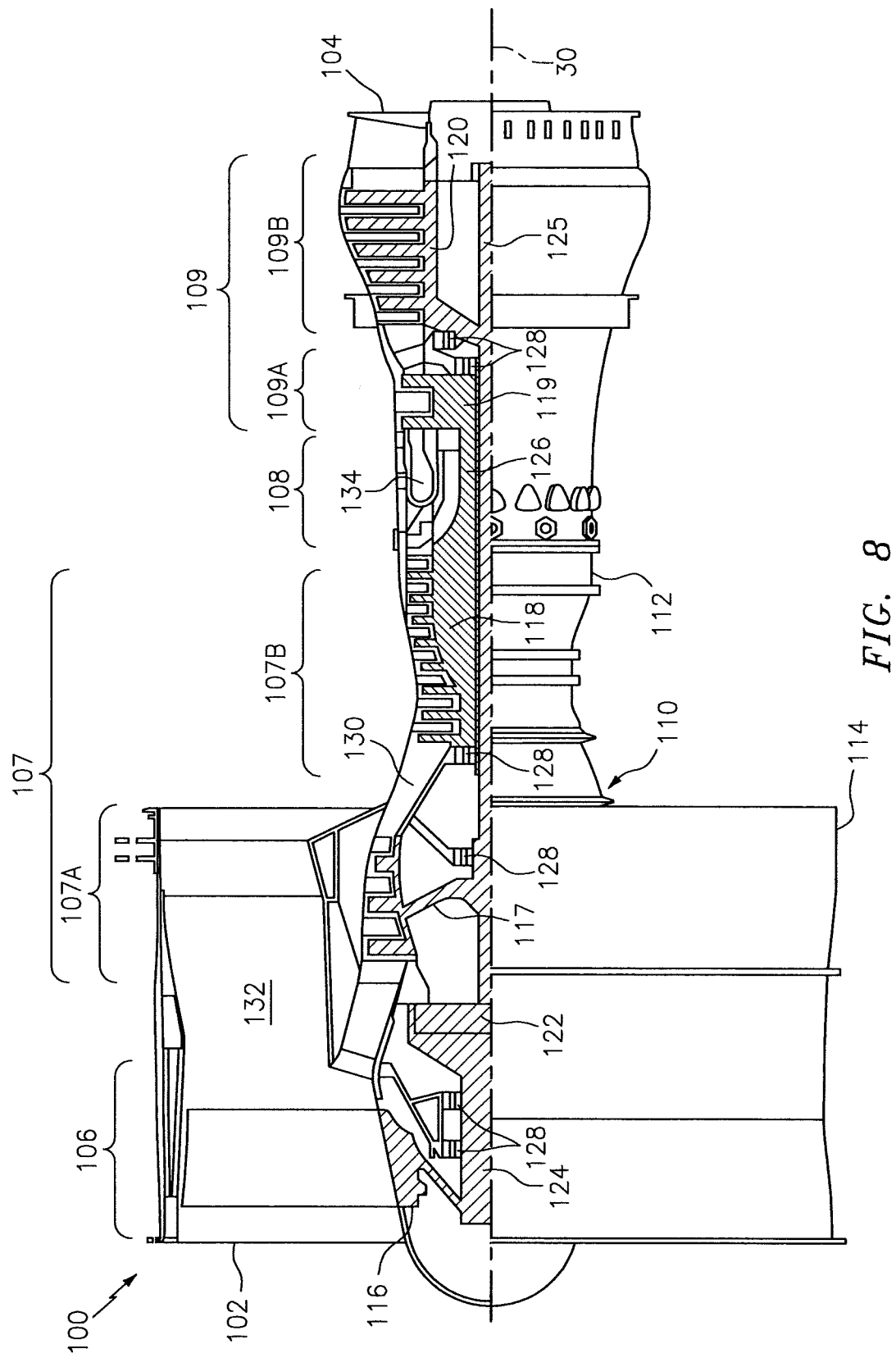
FIG. 8 is a side cutaway illustration of a gas turbine engine.

FIG. 8 illustrates an exemplary geared turbofan gas turbine engine 100 in which the system 10 may be included. This turbine engine 100 extends along the rotational axis 30 between an upstream airflow inlet 102 and a downstream airflow exhaust 104. The turbine engine 100 includes a fan section 106, a compressor section 107, a combustor section 108 and a turbine section 109. The compressor section 107 includes a low pressure compressor (LPC) section 107A and a high pressure compressor (HPC) section 107B. The turbine section 109 includes a high pressure turbine (HPT) section 109A and a low pressure turbine (LPT) section 109B.

The engine sections 106, 107A, 107B, 108, 109A and 109B are arranged sequentially along the rotational axis 30 within an engine housing 110. This housing 110 includes an inner case 112 (e.g., a core case) and an outer case 114 (e.g., a fan case). The inner case 112 may house one or more of the engine sections 107A, 107B, 108, 109A and 109B; e.g., an engine core. The outer case 114 may house at least the fan section 106.

Each of the engine sections 106, 107A, 107B, 109A and 109B includes a respective rotor 116-120. Each of these rotors 116-120 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 116 is connected to a gear train 122, for example, through a fan shaft 124. The gear train 122 and the LPC rotor 117 are connected to and driven by the LPT rotor 120 through a low speed shaft 125. The HPC rotor 118 is connected to and driven by the HPT rotor 119 through a high speed shaft 126. The shafts 124-126 are rotatably supported by a plurality of bearings 128; e.g., the bearing 13 of FIG. 1. Each of these bearings 128 is connected to the engine housing 110 by at least one stationary structure such as, for example, an annular support strut.

During operation, air enters the turbine engine 100 through the airflow inlet 102. This air is directed through the fan section 106 and into a core gas path 130 and a bypass gas path 132. The core gas path 130 extends sequentially through the engine sections 107-109. The bypass gas path 132 extends away from the fan section 106 through a bypass duct, which circumscribes and bypasses the engine core. The air within the core gas path 130 may be referred to as "core air". The air within the bypass gas path 132 may be referred to as "bypass air".

The core air is compressed by the compressor rotors 117 and 118 and directed into a combustion chamber 134 of a combustor in the combustor section 108. Fuel is injected into the combustion chamber 134 and mixed with the compressed core air to provide a fuel-air mixture. This fuel air mixture is ignited and combustion products thereof flow through and sequentially cause the turbine rotors 119 and 120 to rotate. The rotation of the turbine rotors 119 and 120 respectively drive rotation of the compressor rotors 118 and 117 and, thus, compression of the air received from a core airflow inlet. The rotation of the turbine rotor 120 also drives rotation of the fan rotor 116, which propels bypass air through and out of the bypass gas path 132. The propulsion of the bypass air may account for a majority of thrust generated by the turbine engine 100, e.g., more than seventy-five percent (75%) of engine thrust. The turbine engine 100 of the present disclosure, however, is not limited to the foregoing exemplary thrust ratio.

The system 10 may be included in various aircraft and industrial turbine engines other than the one described above as well as in other types of rotational equipment. The system 10, for example, may be included in a geared turbine engine where a gear train connects one or more shafts to one or more rotors in a fan section, a compressor section and/or any other engine section. Alternatively, the system 10 may be included in a turbine engine configured without a gear train. The system 10 may be included in a geared or non-geared turbine engine configured with a single spool, with two spools (e.g., see FIG. 8), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A system, comprising:
   a support structure including a cavity surface, an aperture, and an annular channel, the cavity surface at least partially forming a boundary of a cavity, and the aperture extending partially into the support structure from the cavity surface; and
   a nozzle including a mount, a neck and a head, the mount seated within the aperture, the neck connected to the mount and extending axially along a centerline away from the surface to the head, and the head configured to inject fluid out of the nozzle through a plurality of nozzle orifices in the head and into the cavity;
   a first fluid passage extending within the support structure to the aperture;
   a second fluid passage extending within the nozzle to the plurality of nozzle orifices, the second fluid passage fluidly coupled with the first fluid passage; and
   a retainer configured to retain the mount within the aperture, the retainer projecting radially into the annular channel.

2. The system of claim 1, further comprising a seal element sealingly engaged with and disposed between the support structure and the mount.

3. The system of claim 1, further comprising an annular seal element sealingly engaged with and disposed axially between an annular surface of the support structure and an annular surface of the mount, wherein the annular surface of the support structure partially forms a boundary of the aperture.

4. The system of claim 1, further comprising a seal element sealingly disposed axially between an annular surface of the support structure and an annular surface of the mount, wherein the annular surface of the support structure partially forms a boundary of the aperture, and wherein the seal element radially engages the support structure and the nozzle.

5. The system of claim 1, wherein the retainer
   is a retainer ring; and
   the retainer ring axially engages the mount.

6. The system of claim 1, wherein
   the aperture includes a bore and a counterbore;
   the mount includes a tubular coupler and an annular mounting flange;
   the tubular coupler projects axially into the bore to a distal end of the nozzle; and
   the annular mounting flange is seated within the counterbore.

7. The system of claim 6, wherein the tubular coupler includes a conical surface that engages the support structure.

8. The system of claim 6, further comprising a ring seal sealingly engaged and disposed axially between the annular mounting flange and the support structure, wherein the tubular coupler projects axially through the ring seal and into the bore.

9. The system of claim 6, wherein
   the aperture further includes a slot; and
   the mount further includes a tab that projects radially out from the annular mounting flange and is seated within the slot.

10. The system of claim 1, further comprising a turbine engine component in the cavity, wherein the nozzle comprises a lubricant nozzle, and wherein the nozzle is configured to direct lubricant onto the turbine engine component.

11. The system of claim 1, wherein
    the head is configured to direct a first portion of the fluid out of the nozzle through a first of the plurality of orifices in a first direction; and
    the head is configured to direct a second portion of the fluid out of the nozzle through a second of the plurality of orifices in a second direction that is different from the first direction.

12. A system for a gas turbine engine, comprising:
    a support structure including a first surface and an aperture, the aperture extending partially into the support structure from the first surface, and the aperture including a bore and a counterbore;
    a nozzle including a tubular mount, a tubular neck and a head, the mount including a tubular coupler and an annular mounting flange, the tubular coupler projecting axially along a centerline into the bore to a distal end of the nozzle, the annular mounting flange seated within the counterbore, and the tubular neck connected axially between the annular mounting flange and the head;

a seal ring disposed axially between the annular mounting flange and an annular surface of the support structure; and a retainer within the counterbore and configured to retain the mount within the aperture;

wherein a first fluid passage extends within the support structure to the aperture; and wherein a second fluid passage extends within the nozzle to a plurality of nozzle orifices in the head, and is fluidly coupled with the first fluid passage.

13. The system of claim 12, wherein the first surface at least partially forms a boundary of a cavity; and the head is configured to inject lubricant out of the nozzle and into the cavity.

14. The system of claim 12, wherein the retainer is a retainer ring;

axially engages the annular mounting flange; and is seated within an annular channel that extends radially into the support structure.

15. The system of claim 12, wherein the tubular coupler includes a conical surface that engages the support structure.

16. The system of claim 12, wherein the aperture further includes a slot; and the mount further includes a tab that projects radially out from the annular mounting flange and is seated within the slot.

* * * * *